Dec. 13, 1960    W. L. DE FIBAUGH    2,964,020
DEVICE FOR PISTON STROKE ADJUSTMENT
Filed March 9, 1959    2 Sheets-Sheet 1
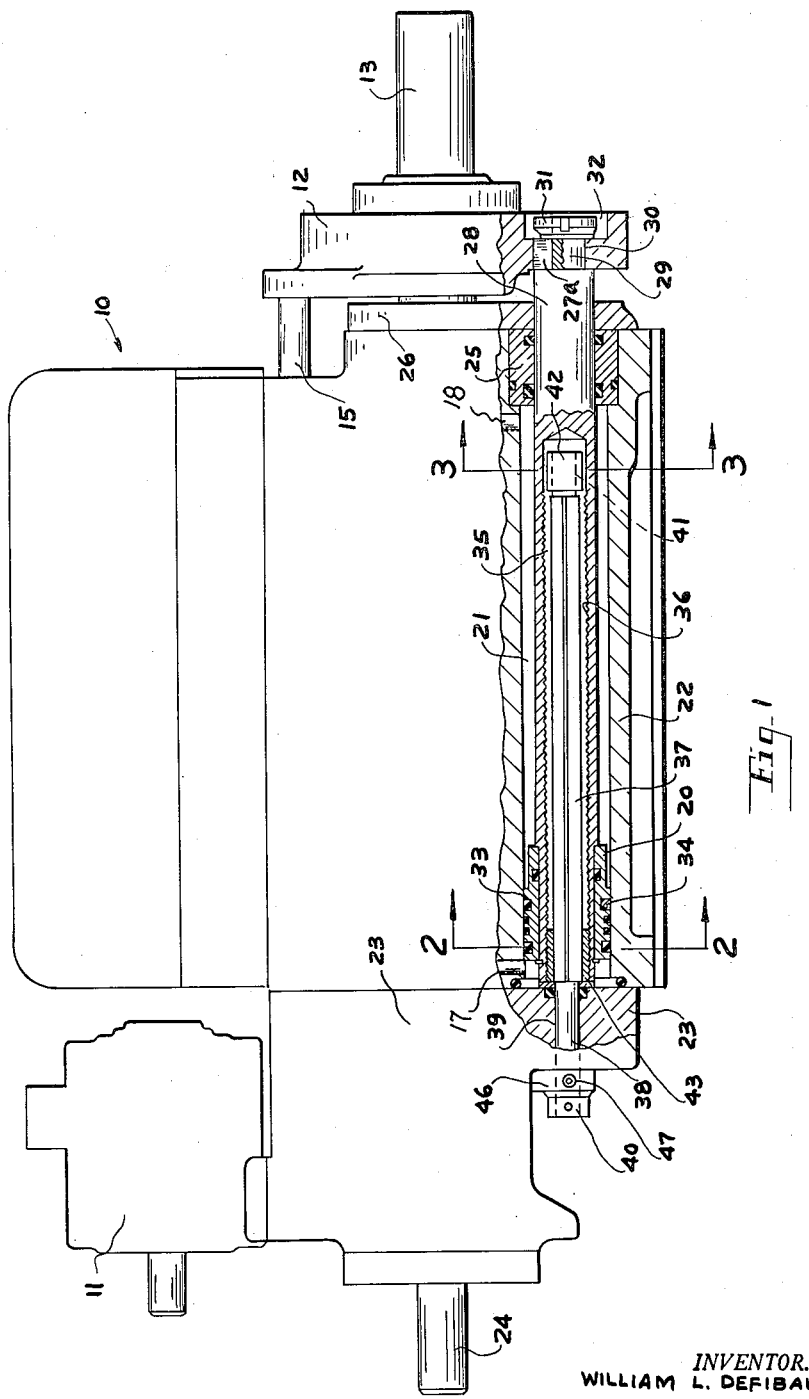
INVENTOR.
WILLIAM L. DEFIBAUGH
BY Louis Chayka
ATTORNEY

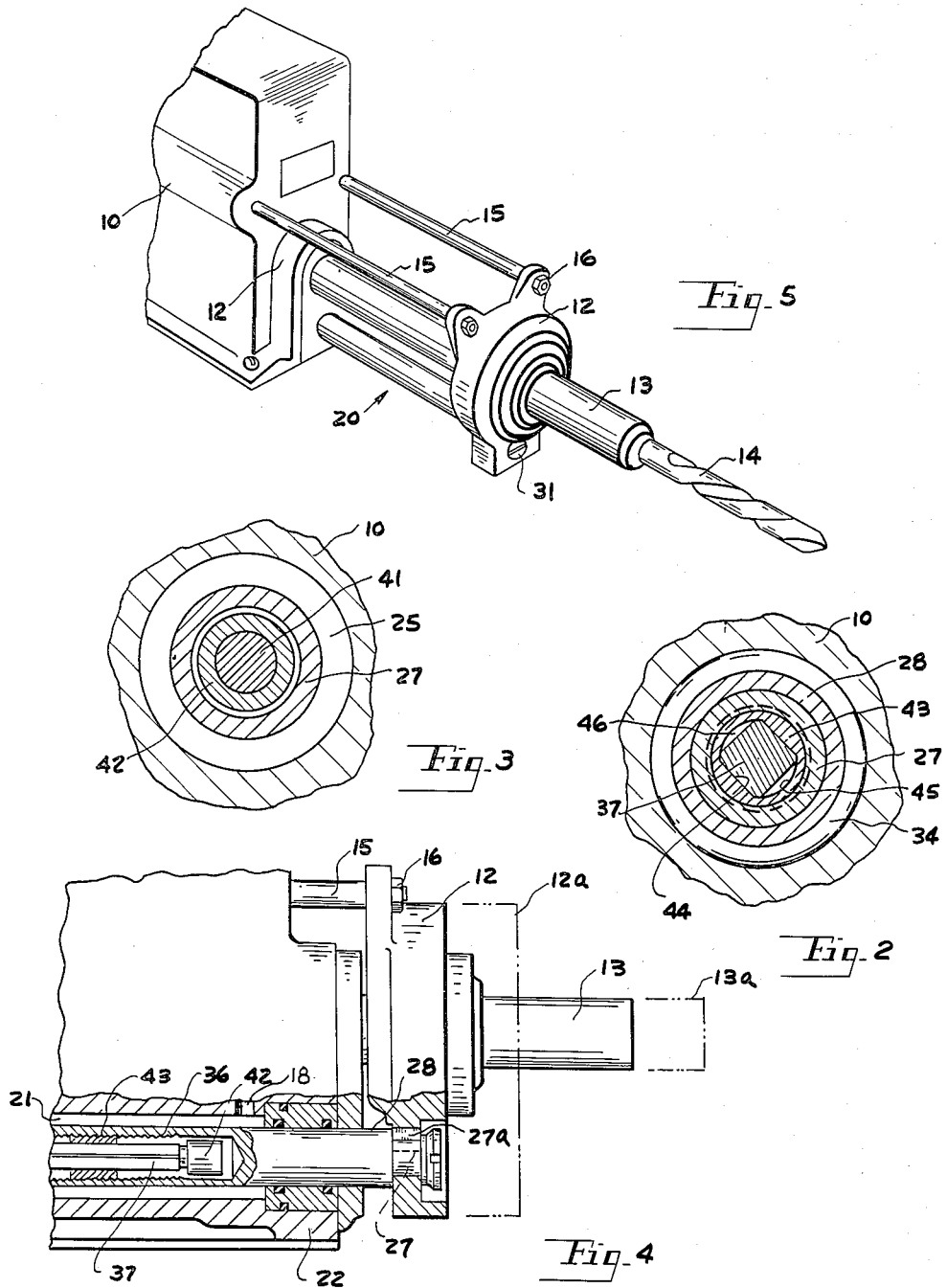

United States Patent Office 2,964,020
Patented Dec. 13, 1960

2,964,020
DEVICE FOR PISTON STROKE ADJUSTMENT

William L. Defibaugh, 11075 Lillian St., Warren, Mich.

Filed Mar. 9, 1959, Ser. No. 797,937

5 Claims. (Cl. 121—45)

In general, the invention pertains to means whereby the length of the stroke of a piston in a cylinder may be adjusted by means located outside the cylinder. A specific application of the invention will be disclosed in a mechanism which includes a power-driven drill assembly and in which a fluid medium under pressure, such as air or oil, is employed to reciprocate a piston whereby the drill assembly is advanced in the course of its operation upon a given object, or retracted therefrom. All the elements of the combination, including also a pump, a plurality of ducts and valves, and automatic switches, form a compact drilling unit. However, as the invention described herein is confined to said piston and to the means to control the length of the stroke thereof, other elements of the unit will be referred to only incidentally when needed for the understanding of the operation of said piston.

I shall now describe my invention with reference to the accompanying drawings in which:

Fig. 1 is an outline, in side elevation, of such a drilling unit, the view including a vertical sectional view of the piston assembly and the bore in which the piston is located;

Fig. 2 is an enlarged sectional view on line 2—2 of Fig. 1;

Fig. 3 is an enlarged sectional view on line 3—3 of Fig. 1;

Fig. 4 is a fragmentary sectional view of the bore with the piston disposed therein, the view including a movable member, the position of which, relative to the length of the bore, determines the length of the stroke of said piston;

Fig. 5 is a fragmentary perspective view of the drill assembly, the view including also a part of the piston rod which is connected to said assembly.

Similar numerals refer to similar parts throughout the several views.

Numeral 10 indicates, generally, the housing of the drilling unit, numeral 11 shows a pump supported thereon, and numeral 12 shows a spindle head carrying a spindle 13 which is adapted to hold a drill 14.

The spindle assembly as a whole is adapted to be actuated by the piston assembly contained in the lower portion of the housing and operated by a fluid medium, such as air or oil, while the drill or drills forming a part of the drill assembly are adapted to be operated by a motor which is not shown.

The ducts for said fluid medium, the valves for said ducts, and the switches in an electric circuit for the operation of the valves are all enclosed in the upper portion of the housing. The operation of the valves is timed to the movement of the drill assembly by means of two rods 15 which are secured to said assembly for movement therewith by nuts 16, as shown in Fig. 4.

As it is the piston assembly to which the invention is directed, I shall now disclose the pertinent details of its structure:

The piston, identified by numeral 20, is disposed in a horizontal bore 21 in the lower portion 22 of the housing 10. For the purpose of the present description, the lower portion of the housing, with the horizontal bore therein, may be considered a cylinder or an equivalent of a cylinder. One end of the bore is blocked off by a solid member 23 which is connected to what may be considered the rear end of the housing, and which serves as a mounting for the pump 11. It is the same member which also contains bearings for a shaft 24 which is axially alined and operatively connected to the spindle 13.

At the opposite end, that is, the end remote from said solid member 23, the bore 21 is enlarged and holds therein a suitable packing, 25. An end plate 26 secured to the front end of the housing holds the packing in place.

The piston 20 is mounted upon one end of a piston rod 28, and is provided with a plurality of annular grooves 33 for reception of piston rings 34 or equivalent means to insure a leak-proof contact of said piston with the interior surface of the bore 21 in which the piston is located.

As the piston is to be operated by oil or air under pressure, a duct for passage of said oil or air, leading from a source of supply, opens into one end portion of the bore, as shown at 17, and a similar duct opens into the other end portion of the bore, indicated at 18.

The piston rod itself is of hollow construction, having therein an axial bore 35 which is threaded, as shown at 36, and which extends from the end supporting said piston to a point spaced from the opposite end remote from said member 23. It is at this end that the piston rod terminates with a portion which is of a reduced diameter, as shown at 29, for insertion through an aperture 30 in the spindle head 12. This end of the piston rod is threaded externally for engagement with a nut 31 which fits into a socket 32 in said spindle head 12. As it is important to keep the piston rod against rotation about its axis, this end contains a radial slot 27 for reception of a key 27a.

Extending axially into the interior bore 35 of the piston rod, from the direction of said member 23, is a shaft 37 which, with the exception of its two end portions, is rectangular in cross-section, as shown in Fig. 2. One end portion 38 of the shaft 37 passes through a horizontal bore 39 in said member 23 and through a collar 46 which is integrally formed with said member 23, and is keyed to a knob 40 whereby said shaft 37 may be rotated about its axis. The opposite end of said shaft, which end is marked 41, terminates at a point close to the end of the bore 35, and carries a short cylindrical sleeve 42 which is of a diameter exceeding the thickness of the rectangular main portion of said shaft 37.

Seated upon the shaft 37 within the bore 35 of the rod 28 is a nut 43. The nut has an axial aperture defined by two opposed arcuate faces 45 and two opposed flat faces 44, the latter being in intimate contact with two opposed flat sides of the shaft 37, while there is an open space 46' between each arcuate face and the flat surface of the shaft. The spaces 46' serve as passages for oil or air. It will be understood that the formation of the aperture in the nut is but one example of how the nut may be seated upon the shaft against rotation upon the shaft but yet to leave a passage for oil or air along said shaft. While the threaded outer surface of said nut is in engagement with the threaded inner surface 36 of the piston rod 28, the nut is capable of a sliding, longitudinal movement upon said shaft, moving together with said piston rod. At this point I wish to add that the end portion 39 which passes through the collar 46 is provided with an annular groove not shown, and that a pin 47 which passes through the collar in a radial position to the shaft projects into said groove. This is a well-known arrangement used in this case to prevent axial movement of said shaft 37 in the course of its being rotated by said knob 40.

As already stated herein, the drilling unit which includes my improved piston assembly requires a motor which is adapted to drive the spindle in the spindle head 12 and import a rotary movement to the drill 14. However, the depth of the drilling operation is controlled by the piston which is connected to the spindle head, as shown in Figs. 1 and 4. Specifically, the extent of the forward travel of the spindle head which carries the drill is determined by the distance between the stationary sleeve 42 on the inner end of the shaft 37 and the nut 43 which is slidingly seated upon said shaft.

In Fig. 1 the nut 43 is shown as seated upon the shaft at the rear end of the piston rod 28. With the nut in this position, the piston 20 would be adapted to cover the length of its full stroke till the nut 43 would be brought into contact with the sleeve 42 at the inner end of the shaft 37. The sleeve would prevent further progressive movement of the piston rod. Should it be desired to shorten the stroke of the piston, this may be effected by shifting the nut 43 closer to the sleeve 42, which may be accomplished by rotating the shaft 37 about its axis. It is for this purpose that the shaft is provided with a knob 40. Such a new position of the nut 43 upon the shaft 37 is shown in Fig. 4.

It will be noted that the piston rod 28 is in the same position with respect to the housing 10 as shown at Fig. 1, but that the nut 43 is in a relatively short spacing from the sleeve 42. Because of this position of the nut, the thrust of the piston, as carried by the piston rod 28, would be limited to this shorter distance between the nut and said sleeve. Consequently, the length to which the spindle head with the spindle and the drill therein could be moved forwardly would be limited to said shorter distance. The position of the spindle head and the spindle so moved forwardly is indicated in Fig. 4 in dotted lines, wherein numeral 12a shows the spindle head and numeral 13a indicates the spindle.

It will be obvious that some changes may be made in the structure of the material elements in the combination of parts described by me without departing from the inventive concept disclosed herein.

What I, therefore, wish to claim is as follows:

1. In combination, a cylinder, a closure at one end thereof, the closure having an axial aperture therein, a piston rod axially disposed in the cylinder but held against rotation about its axis, the piston rod having a threaded axial bore, a piston seated on the piston rod at the end facing said closure, a rotative shaft passing through the aperture in said closure into the interior of the piston rod, a radially-expanded head at the inner end of the shaft, a nut slidably seated upon the shaft for rotation therewith but being in engagement with the threaded inner surface of said piston rod, and a knob at the outer end of the shaft, outside the cylinder, whereby on rotation of the shaft the position of the nut within the piston rod may be adjusted to the desired spacing from said head on the shaft.

2. In combination, a cylinder, a closure at one end, the closure being provided with an axial aperture, a piston disposed within the cylinder, a piston rod axially disposed within the cylinder against rotation about its axis and connected at one end to said piston, a packing at the other end of the cylinder, the packing embracing the piston rod, said piston rod having an axial threaded bore extending from the end facing the closure, a stationary shaft extending through the aperture in the closure axially into the piston rod, a radially expanded head at the inner end of the shaft, the shaft having an outer end outside the cylinder, a nut seated upon the inner end of the shaft for a sliding longitudinal movement thereon, the nut being in engagement with the threaded inner surface of the piston rod for rotation with the shaft about the axis thereof, the piston rod with the piston and the nut therewithin being reciprocally movable within the cylinder while the shaft remains therein in a stationary position, and manual means on the outer end of the shaft to rotate the shaft with the nut thereon about the axis of said shaft for adjusting the spacing between said head and nut.

3. In combination, a cylinder closed at one end, a piston disposed therein, the piston having an axial aperture, a hollow piston rod at one end axially secured to said piston, key means at one end of the cylinder to prevent axial rotation of the piston rod, the inner surface of the piston rod being threaded, a stationary shaft extending into the interior of the piston rod through said closed end, a radially-expanded head on the inner end of the shaft, a nut seated upon the shaft for longitudinal sliding movement thereon, interlocking face means on the shaft and the inner surface of the nut to secure rotation of the nut with the shaft about the axis of said shaft to adjust the position of the nut within the piston rod, and means upon the outer end of the shaft outside the cylinder to rotate the same with the nut to adjust the spacing of the nut from the stationary head on said shaft.

4. In a cylinder, a closure at one end, the closure being provided with an axial aperture, a piston disposed within the cylinder, the piston having an axial aperture therein, a hollow piston rod at one end axially secured to the piston, a packing at the other end of the cylinder with a passage for said piston rod, a port at each end of the cylinder for selective passage thereinto of a fluid medium under pressure, a shaft extending through the aperture in said closure into the cylinder and into the interior of the hollow piston rod, the shaft being polygonal in cross-section, the inner end of the shaft having a radially-expanded head, a nut seated on the shaft for a sliding movement thereon, the nut having an axial aperture corresponding in form to the cross-section of the shaft to secure rotation of the nut with the shaft about the axis of said shaft, the outer surface of the nut being in engagement with the threads of the piston, and means on the outer end of the shaft to rotate it about its axis to adjust longitudinally the position of the nut within the piston rod with respect to the stationary head on said shaft.

5. In a cylinder having a piston reciprocal therein but incapable of turning about its axis, a hollow piston rod for said piston, the piston rod being threaded internally, a stationary shaft axially extending from one end of the cylinder through the piston into the interior of the hollow piston rod, a radially-expanded head on the inner end of the shaft, a nut seated on said shaft for a sliding longitudinal movement thereon, but being meshed with the threads on the inner surface of the piston rod, the nut being rotatable by the shaft rotating about its axis, and the shaft being rotatable manually from one end externally of said cylinder, to cause longitudinal movement of the nut within the piston rod, the nut serving to stop longitudinal movement of the piston on encounter with said head on the shaft.

References Cited in the file of this patent

UNITED STATES PATENTS

| | | |
|---|---|---|
| 1,283,675 | Coleman | Nov. 5, 1918 |
| 1,998,873 | Kingsbury | Apr. 23, 1935 |
| 2,397,106 | Haller | Mar. 26, 1946 |